United States Patent [19]

Sugimori et al.

[11] Patent Number: 4,690,974
[45] Date of Patent: Sep. 1, 1987

[54] METHOD FOR PRODUCING RUBBER MODIFIED THERMOPLASTIC RESINS

[75] Inventors: Teruhiko Sugimori, Otake; Noriyuki Tajiri, Toyohashi; Yutaro Fukuda, Otake, all of Japan

[73] Assignee: Mitsubishi Rayon Co., Ltd., Tokyo, Japan

[21] Appl. No.: 864,868

[22] Filed: May 20, 1986

[30] Foreign Application Priority Data

May 21, 1985 [JP] Japan ................................ 60-109102
May 22, 1985 [JP] Japan ................................ 60-110989

[51] Int. Cl.[4] ............................................. C08L 51/00
[52] U.S. Cl. ......................................... 525/64; 525/67; 525/71; 525/73; 525/80; 525/86; 525/100; 525/103; 525/106; 528/501
[58] Field of Search ....................... 525/64, 67, 70, 71, 525/73, 100, 103, 106, 80, 86; 523/331; 528/501

[56] References Cited

U.S. PATENT DOCUMENTS 4,105,510 8/1978 Tago et al. ............................ 203/14

Primary Examiner—Theodore E. Pertilla
Attorney, Agent, or Firm—Oblon, Fisher, Spivak, McClelland & Maier

[57] ABSTRACT

Disclosed is a method for producing a rubber modified thermoplastic resin excellent in surface appearance and various properties and high in commercial values which comprises removing an aqueous phase from a two-phase mixture comprising a graft rubber polymer latex (1) obtained by graft polymerization of vinyl monomer on a rubber latex, a thermoplastic resin (2), an organic agent in an amount of 0.1 to 6 times the weight of all the polymers (3) which is capable of dissolving said thermoplastic resin (2) and has a solubility in water of 5% by weight or less at 25° C. and a water soluble agent in an amount of 10% by weight or less of said graft rubber polymer which can coagulate said latex and then removing said organic agent and remaining water from the remaining organic phase by a thermal means.

8 Claims, No Drawings

METHOD FOR PRODUCING RUBBER MODIFIED THERMOPLASTIC RESINS

This invention relates to a method for producing a rubber modified thermoplastic resin which comprises mixing a graft rubber polymer produced by graft polymerization of a vinyl monomer on a rubber and a thermoplastic resin, and more particularly it relates to a method for very efficiently producing a rubber modified thermoplastic resin superior in dispersibility of graft rubber polymer particles by mixing a coagulated substance of a graft rubber polymer latex and a thermoplastic resin in the presence of a specific amount of an organic solvent.

Generally, most of the rubber modified thermoplastic resins represented by ABS resins are those obtained by mixing and kneading a polymer obtained by graft polymerization of a vinyl monomer on a rubber latex and a thermoplastic resin. Usually, production of them comprises the steps of emulsion graft polymerization, coagulation, solidifying, dehydration, drying, blending, and melt extrusion. The emulsion graft polymerization step is a step of producing a graft polymer latex by emulsion graft polymerizing an acrylic monomer, vinyl cyanide monomer, vinyl aromatic monomer, etc. on a diene rubber latex, vinyl rubber latex, natural rubber latex, silicone rubber latex and the like. The coagulation and solidifying steps are steps of adding a coagulant such as polyvalent salts and acids to the graft polymer latex to destroy the emulsion state and coagulate the polymer and solidifying the polymer into rigid powders. The dehydration and drying steps are steps of removing the aqueous phase from the mixture of the powdered polymer and water by a means such as centrifugal dehydration or the like and further drying the powders by a means such as flow drying method to obtain dry powders. The blending step is a step of blending said dry powders with other thermoplastic resins and additives such as stabilizer, lubricant, plasticizer, etc. The melt extrusion step is a step of melting, kneading and extruding the blend materials into strands by screw extruder and pelletizing them.

One of the problems in production and quality of the products brought about in the above method of producing rubber modified thermoplastic resins comprising the above steps is firstly that much heat is required. This is because of the use of a large quantity of hotair at the drying step. The second problem is that since the graft rubber polymer particles are completely coalesced at the coagulating and soldifying steps, a large amount of power is required for completely dispersing the coalescing graft rubber polymer particles in thermoplastic resin at the melting and kneading procedures after the blending step. In the worst case, it becomes industrially impossible to uniformly disperse the graft rubber polymer particles in the thermoplastic resin.

Some proposals have been made to improve the conventional methods of production of rubber modified thermoplastic resins which have problems leading to reduction of industrial competitiveness and some of them have been industrially practised. One of them has aimed at reduction of heat used at the drying step and utilized a screw extruder generelly called a dehydration extruder which has a dehydration function. The proposed methods of this type are roughly classified into those according to which the blend of the graft rubber wet powders after subjected to coagulation, solidification and dehydration and other thermoplastic resins and additives or the graft rubber wet powders alone is fed to said dehydration extruder and those according to which graft rubber polymer latex and coagulant together with other thermoplastic resins and additives, if necessary, are fed to said dehydration extruder.

According to these methods the reduction of the heat used can be expected because the drying step at which a large quantity of hot air is used is omitted, but the procedure of dispersing homogeneously the graft rubber polymer particles in the thermoplastic resin is at the same level as that of the conventional techniques. That is, according to the former methods as classified, graft rubber polymer particles in completely coalescing state are treated and thus these methods are the same as the conventional ones from the point of dispersion of particles. According to the latter methods, latex and coagulant are firstly mixed in a treating apparatus and then subjected to dehydration at about 100° C. or lower and at this time the graft rubber polymer particles are ordinarily in the coalescing state. Thereafter, with elevation of temperature the particles melt with the thermoplastic resin are subjected to the kneading procedure. Thus, these methods are different from the former methods only in the state of the starting materials supplied and are similarly the same as the conventional techniques with respect to the dispersion of particles.

There have been further proposed the method where a latex of graft rubber polymer, a coagulant and a monomer are mixed to form a two-phase mixture consisting of an organic phase and an aqueous phase, then the aqueous phase is removed and the monomer contained in the organic phase is polymerized and another method where the monomer is polymerized without removing the aqueous phase from the two-phase mixture, then the aqueous phase is removed and the polymer is dried These methods are free from the state where the graft rubber polymer particles completely coalesce with each other and hence are distinguishable from the above method using the dehydration extruder on the dispersion of particles. However, in the former method it is necessary to polymerize the high viscous mixture of graft polymer and monomer without bringing about run-away reaction and thus this method has difficulties in apparatus and operation and is not necessarily superior method. Besides, content of rubber component in rubber modified thermoplastic resins has a great effect on the basic properties of resins and for this reason it is impossible to employ the technique by which polymerization is accomplished at a low conversion of high fluctuation of the conversion as in the usual bulk polymerization and the remaining monomer is removed by devolatizing and the reaction must be proceeded until a high conversion where the fluctuation of the conversion is low is attained. Therefore, the reactants become highly viscous and temperature becomes high as compared with even the general bulk polymerization process and so handling of them becomes very difficult. On the other hand, according to the latter method, the monomer is polymerized by suspension polymerization and viscosity of the reactants is low and heat of reaction can be easily removed, but dehydration and drying steps are required and this method is also not an excellent method like the former method.

As mentioned hereinabove, many proposals have been made for the production of rubber modified thermoplastic resins. However, at present, there have not yet been provided the methods according to which both the homogeneous dispersion of graft rubber polymer particles which is essential for development of the basic proporties of the resins and the reduction of heat required are simultaneously attained and the desired resins of high quality and high competitiveness can be obtained This invention provides a method for producing a rubber modified thermoplastic resin which makes it possible to attain homogeneous dispersion of graft rubber polymer particles in thermoplastic resin and which can acieve a saving of energy.

This invention relates to a method for producing a rubber modified thermoplastic resin which comprises removing aqueous phase from a two-phase mixture comprising (1) a latex of a graft rubber polymer obtained by graft polymerization of a vinyl monomer on a rubber latex, (2) a thermoplastic resin, an organic agent in an amount of 0.1 to 6 times the weight of all polymers (3) which is capable of dissolving said thermoplastic resin (2) and has a solubility in water of 5% by weight or less at 25° C. and a water soluble agent in an amount of 10% by weight or less of said graft rubber polymer which can coagulate said graft rubber polymer latex and then removing said organic agent and the remaining water from the remaining organic phase by a thermal means.

According to another embodiment of this invention, the aqueous phase is removed from said two-phase mixture from which the thermoplastic resin (2) is omitted, then the remaining organic phase is mixed with thermoplastic resin (2) and thereafter from the resultant mixture are removed said organic agent and the remaining water by a thermal means.

According to further another embodiment of this invention, the object of this invention can also be achieved by removing aqueous phase from said two-phase mixture containing thermoplastic (2), then further adding thereto thermoplastic resin (4) and removing from the resulting mixture said organic agent and the remaining water by a thermal means.

In this invention there is no limitation in the order of mixing of graft rubber polymer latex (1), thermoplastic resin (2), the organic agent and coagulating water soluble agent. However, generally, mixing is carried out in the order of graft rubber polymer latex (1), coagulating water soluble agent, thermoplastic resin (2) and the organic agent or first, graft rubber polymer latex (1) and coagulating water soluble agent are mixed and thereafter, this mixture is mixed with the organic agent alone or a mixture of the organic agent and thermoplastic resin (2).

The rubber latex used in this invention includes all of those which have been used as the raw materials for rubber modified thermoplastic resins. As examples thereof, mention may be made of latices of diene rubbers such as polybutadiene, polyisoprene, SBR, etc., those of olefin rubbers such as ethylenepropylene rubber, ethylenevinyl acetate rubber, etc., those of acrylic rubbers such as polyethyl methacrylate, polyethyl acrylate, polybutyl methacrylate, polybutyl acrylate, etc., those of silicone rubbers such as polydimethylsiloxane, etc. These rubber latices may be used singly or in combination of two or more. It is needless to say that in this invention the kind of rubbers has no limitation and in addition to those as enumerated above there may be used any latices of polymers having a rubber elasticity at the temperatures at which the rubber modified thermoplastic resins to be produced are used.

It is very difficult to homogeneously disperse the rubber particles contained in the rubber latices as mentioned above in thermoplastic resins by the conventional methods and even if it becomes possible, satisfactory properties cannot be developed due to bad compatibility between rubber and thermoplastic resin. Therefore, graft polymerization is employed as a means to improve the compatibility and to make possible the dispersion of rubber particles thereby to develop excellent properties.

Vinyl monomers are used for this graft polymerization because the polymerization method is emulsion radical polymerization and it is common to choose the optimum vinyl monomer considering the compatibility and adhesion with the thermoplastic resin to be blended. The same thing can also be applied to this invention. Thus, the vinyl monomers used in this invention for graft polymerization on rubbers include those which have been hitherto used, namely, vinyl cyanide monomers such as acrylonitrile, methacrylonitrile, etc., vinyl aromatic monomers such as styrene, α-methyl styrene, etc., methacrylates such as methyl methacrylate, phenyl methacrylate, etc., halogenated vinyl monomers such as methyl chloroacrylate, 2-chloroethyl methacrylate, etc., and other radical polymerizable monomers.

The thermoplastic resins (2) used in this invention include all of those which are soluble in the organic agents mentioned-hereinafter and the typical examples thereof are acrylonitrile-styrene copolymers, acrylonitrile-α-methylstyrene copolymers, acrylonitrile-α-methylstyrene-N-phenylmaleimide copolymers, polystyrenes, polymethyl methacrylate, polyvinyl chloride, polycarbonate, polysulfone, polyethylene terephthalate and the like.

As thermoplastic resins (4), mention may be made of those which satisfy the same conditions as for the thermoplastic resins (2) and examples thereof are the same as those of thermoplastic resins (2).

Thermoplastic resins (2) and (4) used may be the same or different.

Whether the thermoplastic resin (2) is mixed before or after the removal of aqueous phase from the two-phase mixture may be determined depending on the affinity between the graft rubber polymer or the thermoplastic resin and the organic agent used. When the affinity between the graft rubber polymer and the organic agent is too great, if thermoplastic resin (2) is added after aqueous phase has been removed from the two-phase mixture free of thermoplastic resin (2), it sometimes occurs that dissolving and mixing effects of the organic agent are insufficient and thermoplastic resin (2) is not fully mixed to result in insufficient dispersion of the graft rubber polymer particles in the thermoplastic resin. In this case, desirably, the organic agent is added to the two-phase mixture before the aqueous phase is removed therefrom and where the graft rubber polymer and the thermoplastic resin coexist.

On the other hand, since the volumetric proportion of the aqueous phase in the two-phase mixture is usually the same as or more than that of the organic phase, addition of thermoplastic resin (2) after the aqueous phase has been removed from the two-phase mixture has the advantage of increase of volumetric efficiency of apparatuses employed because the aqueous phase and the thermoplastic resin do not coexist.

The organic agents used in this invention are those which have a solubility in water of 5% by weight or less, preferably 2% by weight or less at 25° C., namely, which cannot be contained in an amount of more than 5 g, preferably more than 2 g in 100 g of aqueous solution at 25° C. and which can dissolve said thermoplastic resins (2) and (4). This organic agent can be used in an amount of 0.1-6 times, preferably 0.2-2 times the weight of all polymers including thermoplastic resins (2) and (4).

When the solubility of the organic agent in water at 25° C. is more than 5% by weight, the aqueous phase of the two phases separated in the mixture becomes cloudy.

When amount of the organic agent is less than 0.1 time the weight of all the polymers (3) including the graft rubber polymer contained in latex (1) and thermoplastic resins (2) and (4), the effect aimed at in this invention cannot be developed. On the other hand, when the organic agent is used in an amount of more than 6 times the weight of all the polymers, a large quantity of heat is required for removal of the organic agent. These are not preferred from the industrial viewpoint.

As examples of the organic agents used in this invention, mention may be made of non-polymerizable organic agents such as petroleum ether, benzene, toluene, xylene, ethylbenzene, p-cymene, tetralin, methylene chloride, chloroform, carbon tetrachloride, trichlene, chlorobenzene, epichlorohydrin, methyl-n-propyl ketone, acetophenone, n-propyl acetate, n-butyl acetate, 1-nitropropane, etc. and polymerizable organic agents such as styrene, methyl methacrylate, o-methylstyrene, etc. These are mere examples and this invention is never limited to these examples and any organic agents which satisfy the above conditions may be used singly or in combination of two or more.

The water soluble agents having coagulating ability used in this invention include any materials which are water soluble and have an ability to coagulate the latex of graft rubber polymer used and may be used in an amount of 10% by weight or less, preferably 5% by weight or less, more preferably 3% by weight or less of said graft rubber polymer for not causing deterioration of quality of resins to be produced. Generally, the water soluble agent is used in an amount of at least 0.2% by weight. As examples of these materials, mention may be made of polyvalent salts such as aluminum sulfate, aluminum chloride, aluminum nitrate, magnesium sulfate, calcium chloride, calcium nitrate, etc., inorganic acids such as sulfuric acid, hydrochloric acid, nitric acid, etc. and organic acids such as acetic acid, propionic acid, etc.

According to this invention, when graft rubber polymer latex (1), thermoplastic resin (2) (which may be abesent at this stage), the organic agent and the coagulant as explained hereinabove are mixed, the mixture separates into an organic phase composed of graft rubber polymer, thermoplastic resin (2) (if present), the organic agent, a slight amount of a polymerization assistant soluble in said organic agent, etc. and an aqueous phase composed of the coagulant, water, a slight amount of a water soluble polymerization assistant, etc. The aqueous phase is separated from this two-phase mixture by common means such as decantation, centrifugal dehydration, press-dehydration, etc. When the organic phase mainly composed of the graft rubber polymer, the thermoplastic resin (if present) and the organic agent is heated to remove the organic agent and a slight amount of remaining water by the conventional devolatizing method, there can be obtained a rubber modified thermoplastic resin having graft rubber polymer particles homogeneously dispersed in the thermoplastic resin.

The reason why the graft rubber polymer particles can be homogeneously dispersed in the thermoplastic resin according to this invention is considered that the graft rubber polymer particles are always in the dispersed or softly agglomerated state through the course of production until a final product without the conventional step at which the graft rubber polymer particles completely adhere to each other. Furthermore, this invention does not require use of dryers which has caused a large quantity of heat loss and makes possible the production by the common devices having devolatizing function such as vented extruders, film type evaporators, etc. Thus, this invention makes a great contribution on production cost to the rubber modified thermoplastic resin industries.

The following examples and reference examples illustrate the method of this invention and effects attained by this invention. The parts in theses examples and reference examples are all by weight.

EXAMPLE 1

Acrylonitrile and styrene were graft polymerized on polybutadiene latex of 0.36 μm in average particle diameter in accordance with the formulation of Table 1 to obtain a latex of graft rubber polymer.

TABLE 1

| | |
|---|---|
| Polybutadiene latex | 114.3 parts |
| (polybutadiene | 40 parts) |
| Acrylonitrile | 15 parts |
| Styrene | 45 parts |
| Sodium laurate | 0.5 part |
| Sodium hydroxide | 0.01 part |
| Rongalite | 0.2 part |
| Ferrous sulfate | 0.002 part |
| EDTA-di-sodium salt | 0.1 part |
| Tertiary butyl hydroperoxide | 0.3 part |
| Laurylmercaptan | 0.3 part |
| Deionized water | 125 parts |
| Polymerization temperature | 70° C. |
| Polymerization time | 240 minutes |

An acrylonitrile-styrene copolymer as a thermoplastic resin was prepared in accordance with the formulation of Table 2.

TABLE 2

| | |
|---|---|
| Acrylonitrile | 25 parts |
| Styrene | 75 parts |
| Azobisisobutyronitrile | 0.3 part |
| Laurylmercaptan | 0.5 part |
| POVAL (polymerization degree 900) | 0.07 part |
| Sodium sulfate | 0.3 part |
| Water | 250 parts |
| Polymerization temperature | 75° C. |
| Polymerization time | 240 minutes |

After completion of polymerization, the resultant suspension of acrylonitrile-styrene copolymer was subjected to centrifugal dehydration and dried at 80° C. to obtain a powder of said copolymer.

Then, 300 parts of said latex of graft rubber polymer, 150 parts of said powder of the copolymer, 400 parts of toluene, 1000 parts of 0.1 wt.% aqueous dilute sulfuric acid solution, 0.1% by weight (of weight of all the polymers) of Irganox 1076 (trade mark for aging resister of Ciba-Geigy Co.) and 0.5% by weight (based on the weight of all the polymers) of Armide HT (trade mark for molding assistant of Lion Armour Co.) were mixed to obtain a mixed liquid which separated into an aqueous phase and a high viscous organic phase. The organic phase was taken out and passed through two press rolls to remove superfluous aqueous phase. Said molding assistant in the same amount as above was added thereto and the polymer was molded into pellets by a vented extruder while devolatizing toluene contained in the organic phase. The thus obtained pellets had smooth surface and non-homogeneous portions called, "fish eye", were not found. These pellets were injection molded to make various test pieces and various properties were measured to obtain the results as shown in Table 3. These results show that the rubber modified thermoplastic resin produced in this Example is excellent.

TABLE 3

| Item | Test methods* | Results |
|---|---|---|
| Tensile yield strength | ASTM D-638 (20° C.) | 480 kg/cm² |
| Izod impact strength | ASTM D-256 (20° C., ¼", notched) | 32 kg cm/cm |
|  | (0° C., ¼", notched) | 27 kg cm/cm |
| Rockwell hardness | ASTM D-785 (R scale) | 109 |
| Melt flow rate | ASTM D-1238 (200° C., 5 kg) | 2.1 g/10 min |

*Same in the following Examples and Reference Examples

EXAMPLE 2

A latex of graft rubber polymer was prepared using the same agents as in Example 1 in accordance with the formulation of Table 4.

TABLE 4

| Polybutadiene latex | 228.6 parts |
| (Polybutadiene | 80 parts) |
| Acrylonitrile | 5 parts |
| Styrene | 15 parts |
| Sodium laurate | 0.4 part |
| Sodium hydroxide | 0.01 part |
| Rongalite | 0.15 part |
| Ferrous sulfate | 0.001 part |
| EDTA-di-sodium salt | 0.05 part |
| Tertiary-butyl peroxide | 0.1 part |
| Laurylmercaptan | 0.1 part |
| Deionized water | 50 parts |
| Polymerization temperature | 70° C. |
| Polymerization time | 280 minutes |

When 60 parts of thus obtained graft rubber polymer latex, 80 parts of the acrylonitrile-styrene copolymer as used in Example 1, 70 parts of ethylbenzene and 40 parts of 1 wt.% aluminum sulfate were mixed, the resulting mixed liquid separated into two phases as in Example 1. The organic phase was treated and molded into pellets in the same manner as in Example 1. The surface of the pellets was smooth and no fish eye was recognized. These pellets were injection molded to produce various test pieces and various properties thereof were measured in the same manner as in Example 1 to obtain the results as shown in Table 5. These results show that the rubber modified thermoplastic resin made in this Example is excellent.

TABLE 5

| Items | Results |
|---|---|
| Tensile yield strength | 475 kg/cm² |
| Izod impact strength | (20° C.) 31 kg cm/cm |
| Izod impact strength | (0° C.) 27 kg cm/cm |
| Rockwell hardness | 110 |

TABLE 5-continued

| Items | Results |
|---|---|
| Melt flow rate | 2.4 g/10 min |

EXAMPLE 3

Methyl methacrylate and methyl acrylate were graft polymerized on SBR rubber latex of 0.14 μm in average particle diameter in accordance with the formulation of Table 6 to obtain a latex of graft rubber polymer.

TABLE 6

| SBR rubber latex | 100 parts |
| (SBR rubber | 50 parts) |
| Methyl methacrylate | 45 parts |
| Methyl acrylate | 5 parts |
| Potassium rosinate | 1 part |
| Rongalite | 0.2 part |
| Ferrous sulfate | 0.003 part |
| EDTA-di-sodium salt | 0.1 part |
| Cumene hydroperoxide | 0.4 part |
| Octylmercaptan | 0.2 part |
| Deionized water | 150 parts |
| Polymerization temperature | 65° C. |
| Polymerization time | 240 minutes |

Polymethyl methacrylate as a thermoplastic resin was produced in accordance with the formulation of Table 7.

TABLE 7

| Methyl methacrylate | 100 parts |
| Azobisisobutyronitrile | 0.3 part |
| Laurylmercaptan | 0.5 part |
| Poval (polymerization degree 900) | 0.07 part |
| Sodium sulfate | 0.25 part |
| Water | 200 parts |
| Polymerization temperature | 80° C. |
| Polymerization time | 180 minutes |

After completion of polymerization, the obtained suspension of polymethyl metahcrylate was subjected to centrifugal dehydration and dried at 80° C. to obtain a powder of the polymer.

When 90 parts of said latex of graft rubber polymer, 70 parts of said polymethyl methacrylate powder, 100 parts of chloroform and 300 parts of a 0.1 wt% aqueous magnesium sulfate solution were mixed, the resulting mixed liquid separated into an aqueous phase and a high viscous organic phase. Removal of the aqueous phase, devolatization of chloroform and pelletization were carried out by the apparatus used in the Example 1. The surface of thus obtained pellets was smooth and no fish eye was recognized. These pellets were injection molded to make various test pieces and various properties were measured to obtain the results as shown in Table 8. These results indicate that the rubber modified thermoplastic resin is excellent.

TABLE 8

| Item | Test methods | Results |
|---|---|---|
| Total light transmission | ASTM D-1003 | 86% |
| Dynstat impact strength | DIN 53453 | 18 kg cm/cm² |
| Rockwell hardness | ASTM D-785 (M scale) | 75 |

REFERENCE EXAMPLE 1

The latex of graft rubber polymer produced in Example 1 was coagulated with sulfuric acid by a conventional method and the obtained polymer wet powder was subjected to washing, dehydration and drying to obtain graft rubber polymer dry powder. This graft rubber polymer, the acrylonitrile-styrene copolymer produced in Example 1 and a slight amount of the additives used in Example 1 were mixed and formed into pellets by a screw extruder. The composition of these pellets was the same as that of the pellets obtained in Example 1, but there were many fish eyes on the surface. Thus, the pellets obtained in this Reference Example had no value as commercial products. Furthermore, these pellets were injection molded and subjected to the same tests as in Example 1 to obtain the results as shown in Table 9.

TABLE 9

| Item | Results |
| --- | --- |
| Tensile yield strength | 475 kg/cm$^2$ |
| Izod impact strength | (20° C.) 21 kg cm/cm |
| Izod impact strength | (0° C.) 16 kg cm/cm |
| Rockwell hardness | 109 |
| Melt flow rate | 2.0 g/10 min |

EXAMPLE 4

When 300 parts of the same graft rubber polymer latex as in Example 1, 400 parts of toluene, 1000 parts of a 0.1 wt.% aqueous sulfuric acid solution, 0.1% by weight (based on the weight of all the polymers) of Irganox 1076 (trade mark for aging resister of Ciba-Geigy Co.) and 0.5% by weight (based on the weight of all the polymers) of Armide HT (trade mark for molding assistant of Lion Armour Co.) were mixed, the resulting mixed liquid separated into an aqueous phase and a high viscous organic phase. This organic phase was taken out and passed through two press rolls to remove superfluous aqueous phase. To the organic phase were further added 150 parts of the acrylonitrile-styrene copolymer as used in Example 1 and the above-used molding assistant in the same amount as used above. This was formed into pellets by a vented extruder while devolatizing toluene contained in the high viscous organic phase. Thus obtained pellets had a smooth surface and there were no non-homogeneous portions called fish eye. These pellets were injection molded to make various test pieces and properties thereof were measured to obtain the results as shown in Table 10. These results indicate that the rubber modified thermoplastic resin produced in this example is excellent.

TABLE 10

| Items | Test methods | Results |
| --- | --- | --- |
| Tensile yield strength | ASTM D-638 (20° C.) | 500 kg/cm$^2$ |
| Izod impact strength | ASTM D-256 (20° C., ¼" notched) | 31 kg cm/cm |
| Izod impact strength | ASTM D-256 (0° C., ¼" notched) | 25 kg cm/cm |
| Rockwell hardness | ASTM D-785 (R scale) | 109 |
| Melt flow rate | ASTM D-1238 (200° C., 5 kg) | 2.2 g/10 min |

EXAMPLE 5

60 parts of the same graft rubber polymer latex as used in Example 2, 70 parts of ethylbenzene and 40 parts of 1 wt.% aluminum sulfate were mixed to obtain a mixed liquid which separated into two phases as in Example 1. This was dehydrated by pressing and to the resulting organic phase were added 80 parts of the same thermoplastic resin (acrylonitrile-styrene copolymer) as used in Example 1 and the same molding assistant as used in Example 1. This organic phase was formed into pellets by a vented extruder while devolatizing ethylbenzene. Thus obtained pellets had a smooth surface and no fish eyes were recognized. The pellets were injection molded to make various test pieces and properties thereof were measured in the same manner as in Example 1 to obtain the results as given in Table 11. These results indicate that the rubber modified thermoplastic resin produced in this Example is excellent.

TABLE 11

| Items | Results |
| --- | --- |
| Tensile yield strength | 480 kg/cm$^2$ |
| Izod impact strength (20° C.) | 33 kg cm/cm |
| Izod impact strength (0° C.) | 26 kg cm/cm |
| Rockwell hardness | 108 |
| Melt flow rate | 2.2 g/10 min |

EXAMPLE 6

90 parts of the same graft rubber polymer latex as used in Example 3, 100 parts of chloroform and 300 parts of a 0.1 wt.% aqueous magnesium sulfate solution were mixed to obtain a mixed liquid which separated into an aqueous phase and a high viscous organic phase. This mixed liquid was dehydrated by the same apparatus as used in Example 1 and to thus obtained organic phase were added 70 parts of the samepolymethyl methacrylate as used in Example 3 and the same molding assistant as used in Example 1, followed by devolatizing a part of chloroform by a film type evaporator. Thereafter, the polymer was formed into pellets by a vented extruder while devolatizing the remaining chloroform. These pellets had a smooth surface and no fish eye was seen. These pellets were injection molded to make test pieces and properties thereof were measured to obtain the results as shown in Table 12. These results show that the rubber modified thermoplastic resin produced in this Example is excellent.

TABLE 12

| Items | Test methods | Results |
| --- | --- | --- |
| Total light transmission | ASTM D-1003 | 88% |
| Dynstat impact strength | DIN 53453 | 17 kg cm/cm$^2$ |
| Rockwell hardness | ASTM D-785 (M scale) | 79 |

EXAMPLE 7

300 parts of the same graft rubber polymer latex as used in Example 1, 50 parts of the same copolymer as used in Example 1, 30 parts of toluene, 1000 parts of a 0.1 wt.% aqueous sulfuric acid solution and the same assistant as used in Example 1 were mixed to obtain a mixed liquid which separated into an aqueous phase and a high viscous organic phase. After removal of water, 100 parts of said copolymer was further added thereto. The organic phase was taken out and passed through two press rolls to remove superfluous aqueous phase, followed by adding said molding assistant in the same amount as above. Thereafter, the polymer was shaped into pellets by a vented extruder while devolatizing toluene. Thus obtained pellets had a smooth surface and there were no fish eyes. They were injection molded to make test pieces and properties thereof were measured to obtain the results as given in Table 13. These results show that the rubber modified thermoplastic resin is excellent one.

TABLE 13

| Items | Test method | Results |
|---|---|---|
| Tensile yield strength | ASTM D-638 (20° C.) | 490 kg/cm² |
| Izod impact strength | ASTM D-256 (20° C., ¼", notched) | 33 kg cm/cm |
| Izod impact strength | ASTM D-256 (0° C., ¼", notched) | 26 kg cm/cm |
| Rockwell hardness | ASTM D-785 (R scale) | 111 |
| Melt flow rate | ASTM D-1238 (200° C., 5 kg) | 2.0 g/10 min |

EXAMPLE 8

60 parts of the same graft rubber polymer latex as used in Example 2, 12 parts of the same acrylonitrilestyrene copolymer as used in Example 1, 20 parts of ethylbenzene and 40 parts of a 1 wt.% aluminum sulfate were mixed to obtain a mixed liquid which separated into two phases as in Example 1. The aqueous phase was removed therefrom and 68 parts of said copolymer was further added to the organic phase. This was treated and formed into pellets in the same manner as in Example 1. The surface of thus obtained pellets was smooth and no fish eyes were present. These pellets were injection molded to make test pieces and properties thereof were measured to obtain the results as shown in Table 14. It is recognized from these results that the rubber modified thermoplastic resin obtained in this Example is suprior.

TABLE 14

| Items | Results |
|---|---|
| Tensile yield strength | 485 kg/cm² |
| Izod impact strength | (20° C.) 32 kg cm/cm |
| Izod impact strength | (0° C.) 28 kg cm/cm |
| Rockwell hardness | 109 |
| Melt flow rate | 2.3 g/10 min |

EXAMPLE 9

60 parts of the same graft rubber polymer latex as used in Example 2, 12 parts of the same acrylonitrilestyrene copolymer as used in Example 1, 8 parts of toluene and 500 parts of a 0.1 wt.% aqueous solution of sulfuric acid were mixed to obtain a mixed liquid which separated into two phases as in Example 1. The separating aqueous phase was removed therefrom and 68 parts of the same copolymer as used above was added to the organic phase. This was treated and formed into pellets in the same manner as in Example 1. These pellets had a smooth surface and no fish eyes were present. The pellets were injection molded to make test pieces and properties thereof were measured in the same manner as in Example 1 to obtain the results as given in Table 15. These results show the excellence of the rubber modified thermoplastic resin produced in this Example.

TABLE 15

| Items | Results |
|---|---|
| Tensile yield strength | 490 kg/cm² |
| Izod impact strength | (20° C.) 33 kg cm/cm |
| Izod impact strength | (0° C.) 28 kg cm/cm |
| Rockwell hardness | 110 |

TABLE 15-continued

| Items | Results |
|---|---|
| Melt flow rate | 2.2 g/10 min |

As explained above, according to the method of this invention it becomes easy to uniformly disperse graft rubber polymer particles in a thermoplastic resin and besides it becomes possible to convert a graft rubber polymer into a rubber modified thermoplastic resin without drying the graft rubber polymer with a large quantity of hot air. This means that rubber modified thermoplastic resins excellent in surface appearance and various properties and high in commercial value can be produced at low costs.

What is claimed is:

1. A method for producing rubber modified thermoplastic resin which comprises (a) removing an aqueous phase from a two-phase mixture comprising a graft rubber polymer latex (1) obtained by graft polymerization of a vinyl monomer on a rubber latex, a thermoplastic resin (2), which is soluble in an organic agent, an organic agent in an amount of 0.1 to 6 times the weight of all the pblymers (3) which is capable of dissolving said thermoplastic resing (2) and has a solubility in water of 5% by weight or less at 25° C., wherein the said organic agent comprises petroleum ether, benzene, toluene, xylene, ethylbenzene, p-cymene, tetralin, methylene chloride, chloroform, carbon tetrachloride, trichlene, cholrlbenzene, epichlorlhydrin, methyl-n-propyl ketone, acetophenone, n-propyl acetate, n-butyl acetate 1-nitropropane, styrene, methyl methacrylate, or α-methyl styrene, and a coagulant in an amount of 10% by weight or less of said graft rubber polymer which can coagulate said latex and then (b) removing the said organic agent and the remaining water from the remaining organic phase by a thermal means.

2. A method for producing a rubber modified thermoplastic resin according to claim 1 wherein amount of the water soluble agent which can coagulate the graft rubber polymer latex is 5% by weight or less of the graft rubber polymer.

3. A method for producing a rubber modified thermoplastic resin according to claim 1 which comprises removing the aqueous phase from the two-phase mixture from which the thermoplastic resin (2) is omitted, then adding the thermoplastic resin (2) to the remaining organic phase and thereafter removing from the resulting mixture the organic agent and the remaining water by a thermal means.

4. A method for producing a rubber modified thermoplastic resin according to claim 2 which comprises removing the aqueous phase from the two-phase mixture from which the thermoplastic resin (2) is omitted, then adding the thermoplastic resin (2) to the remaining organic phase and thereafter removing from the resulting mixture the organic agent and the remaining water by a thermal means.

5. A method for producing a rubber modified thermoplastic resin according to claim 1 which comprises removing the aqueous phase from the two-phase mixture, then further adding a thermoplastic resin (4) thereto and removing from the resultant mixture the organic agent and the remaining water by a thermal means.

6. A method for producing a rubber modified thermoplastic resin according to claim 2 which comprises removing the aqueous phase from the two-phase mixture, then further adding a thermoplastic resin (4) thereto and removing from the resultant mixture the organic agent and the remaining water by a thermal means.

7. The method of claim 1, wherein the said thermoplastic resin (2) comprises an acrylonitrilestyrene copolymer, an acrylonitrile-α-methylstyrene copolymer, an acrylonitrile-α-methylstyrene-N-phenylmaleimide copolymer, a polystyrene, a polymethyl methacrylate, a polyvinyl chloride, a polycarbonate, a polysulfone, or a polyethylene terephthalate.

8. The method of claim 1, wherein the said coagulant is a water soluble agent comprising aluminum sulfate, aluminum chloride, aluminum nitrate, magnesium sulfate, calcium chloride, calcium nitrate, sulfuric acid, hydrochloric acid, nitric acid, acetic acid, or propionic acid.

* * * * *